(12) United States Patent
Simske et al.

(10) Patent No.: US 10,572,525 B2
(45) Date of Patent: Feb. 25, 2020

(54) DETERMINING AN OPTIMIZED SUMMARIZER ARCHITECTURE FOR A SELECTED TASK

(71) Applicant: Hewlett-Packard Development Company, L.P., Houston, TX (US)

(72) Inventors: Steven J Simske, Fort Collins, CO (US); Malgorzata M Sturgill, Fort Collins, CO (US); Marie Vans, Ft. Collins, CO (US); Leandro M Farinati, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 495 days.

(21) Appl. No.: 15/305,875

(22) PCT Filed: Apr. 22, 2014

(86) PCT No.: PCT/US2014/034997
§ 371 (c)(1),
(2) Date: Oct. 21, 2016

(87) PCT Pub. No.: WO2015/163857
PCT Pub. Date: Oct. 29, 2015

(65) Prior Publication Data
US 2017/0053027 A1 Feb. 23, 2017

(51) Int. Cl.
*G06F 7/00* (2006.01)
*G06F 17/30* (2006.01)
*G06F 16/34* (2019.01)
*G06F 16/335* (2019.01)
(Continued)

(52) U.S. Cl.
CPC .......... *G06F 16/345* (2019.01); *G06F 16/335* (2019.01); *G06F 16/3334* (2019.01); *G06F 16/907* (2019.01)

(58) Field of Classification Search
CPC .. G06F 16/345; G06F 16/907; G06F 16/3334; G06F 16/335; G06F 16/9537; G06F 16/9535; G06F 17/27; G06F 17/30702; G06F 17/30719; G06F 17/30867
See application file for complete search history.

(56) References Cited

U.S. PATENT DOCUMENTS 7,263,530 B2   8/2007   Hu et al.
7,292,972 B2   11/2007  Lin et al.
(Continued)

FOREIGN PATENT DOCUMENTS

WO   WO-2014058433 A1   4/2014

OTHER PUBLICATIONS

Chang, T-M et al, "A hybrid approach to automatic text summarization", Jul. 8-11, 2008.

*Primary Examiner* — Azam M Cheema
(74) *Attorney, Agent, or Firm* — Dicke Billig & Czaja PLLC (57) ABSTRACT

One example is a system including a plurality of summarization engines, an evaluator, and a selector. Each of the plurality of summarization engines receives content to provide a summary of the content. The evaluator determines a value of each summary for a selected task. The selector selects a summarization engine for the selected task based on the assessed value of each summary.

20 Claims, 4 Drawing Sheets

(51) Int. Cl.
G06F 16/907 (2019.01)
G06F 16/33 (2019.01)

(56) References Cited

U.S. PATENT DOCUMENTS

| | | | |
|---|---|---|---|
| 8,176,418 B2 * | 5/2012 | McKeown | G06Q 10/10 707/638 |
| 8,572,482 B2 | 10/2013 | Yuan et al. | |
| 2004/0153309 A1 * | 8/2004 | Lin | G06F 17/27 704/9 |
| 2005/0118557 A1 | 6/2005 | Sumner, II | |
| 2008/0109425 A1 | 5/2008 | Yin et al. | |
| 2008/0115103 A1 | 5/2008 | Datars et al. | |
| 2011/0314018 A1 | 12/2011 | Bieniosek et al. | |
| 2012/0035912 A1 | 2/2012 | Litvak et al. | |
| 2012/0240032 A1 | 9/2012 | McKeown et al. | |
| 2014/0222834 A1 * | 8/2014 | Parikh | G06F 16/345 707/748 |

* cited by examiner

DETERMINING AN OPTIMIZED SUMMARIZER ARCHITECTURE FOR A SELECTED TASK

BACKGROUND

Summaries provide a concise account of the main facts or features of some type of content, such as a document, There are many different approaches to summarize content. Typically, each approach to summarization viewed individually, as a variety of distinctive approaches to statistical language processing (SLP) and natural language processing (NLP) exist. Summaries can be used in a wide variety of applications to reduce content into a form more beneficial to a user than the original content.

DETAILED DESCRIPTION

In the following detailed description reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
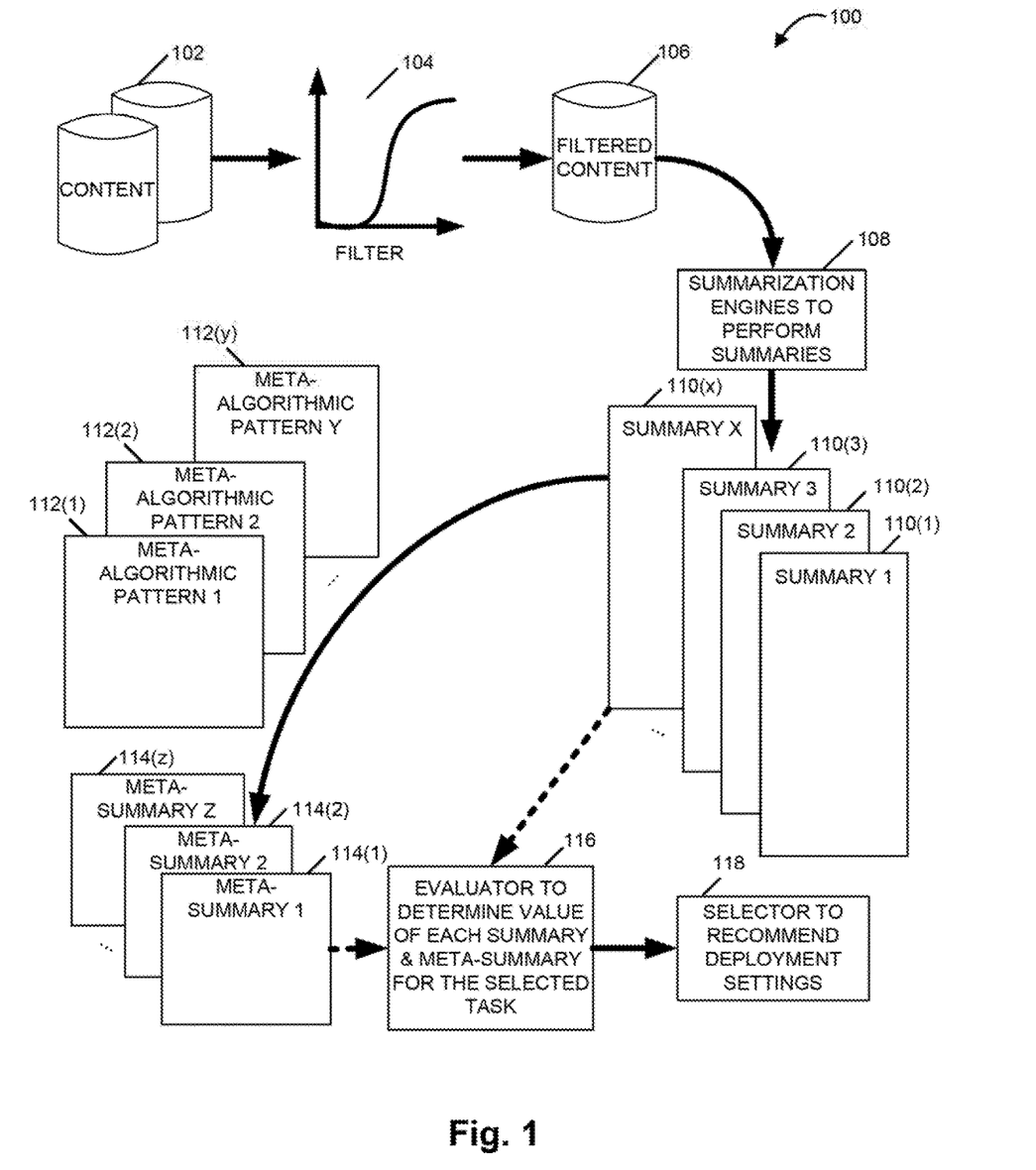
FIG. 1 is a functional block diagram illustrating one example of a system for determining an optimized summarizer architecture for a selected task.

FIG. 1 is a functional block diagram illustrating one example of system 100 for determining an optimized summarizer architecture for a selected task. The system receives content, such as a text document, and filters the content. The filtered content is then processed by a plurality of different summarization engines to provide a plurality of summaries. The summaries may be further processed by a plurality of different meta-algorithmic patterns to provide a plurality of meta-summaries, The summaries and/or meta-summaries are then evaluated to determine a value or relevance of each summary and/or meta-summary, respectively, for the selected task. The summarization engine and/or meta-algorithmic pattern that provides a summary and/or meta-summary, respectively, having a significant value or relevance for the selected task is then recommended for deployment, in this way, a summarizer architecture optimized for a particular task is determined.

Meta-summaries are summarizations created by the intelligent combination of two or more standard or primary summaries. The intelligent combination of multiple intelligent algorithms, systems, or engines is termed "meta-algorithmics", and first-order, second-order, and third-order patterns for meta-algorithmics can be defined.

System 100 includes content 102, a filter 104, filtered content 106, summarization engines 108, summaries 110(1)-110(x), meta-algorithmic patterns 112(1)-112(y), meta-summaries 114(1)-114(z), an evaluator 116, and a selector 118, where "x", y, and "z" are any suitable numbers of summaries, meta-algorithmic patterns, and meta-summaries, respectively. Content 102 includes text and/or other content, such as images, sound, and/or video. Content 102 may include a book, an article, a document, or other suitable information. Filter 104 filters content 102 to provide filtered content 106 suitable for processing by summarization engines 108. In one example, filter 104 may remove common words (e.g., stop words such as "the", "a", "an", "for", and "of") from content 102. Filter 104 may also remove images, sound, video and/or other portions of content 102 to provide filtered content 106. In one example, filter 104 is excluded and content 102 is provided directly to summarization engines 108.

Summarization engines 106 summarize filtered content 106 to provide a plurality of summaries 110(1)-110(x). In one example, each of the summarization engines provides a summary including one or more of the following summarization outputs:

(1) a set of key words;
(2) a set of key phrases;
(3) an extractive set of clauses;
(4) an extractive set of sentences;
(5) an extractive set of clustered sentences, paragraphs, and other text chunks: or
(6) an abstractive summarization or semantic.

In other examples, a summarization engine may provide a summary including another suitable summarization output Different statistical language processing (SLP) and natural language processing (NLP) techniques may be used to generate the summaries.

Meta-algorithmic patterns 112(1)-112(y) are used to summarize summaries 110(1)-110(x) to provide a plurality of meta-summaries 114(1)-114(z). Each of the meta-algorithmic patterns is applied to two or more summaries to provide a meta-summary. In one example, each of the plurality of meta-algorithmic patterns is based on one or more of the following approaches:

(1) weighted voting;
(2) expert feedback;
(3) generalized hybridization;
(4) constrained substitute; or
(5) predictive selection.

In other examples, a meta-algorithmic pattern may be based on another suitable approach.

In the (1) weighted voting approach, the output of multiple summarization engines is combined and relatively weighted based on the relative confidence in each summarization engine and the relative weighting of the terms, phrases, clauses, sentences, and chunks in each summarization. In the (2) expert feedback approach, the expert feedback may be information from a larger corpus as to which words, phrases, and concepts in a document stand out in comparison to a general corpus. In the (3) generalized hybridization approach, first and second order meta-algorithmics are chained. In the (4) constrained substitute approach, one summarization engine may be substituted for another summarization engine based on an attribute of the document, such as the document length or language. The (5) predictive selection approach may include looking at the general topic associated with the key terms in a portion of text and applying a specific summarization engine or set of summarization engines based on membership within a class associated with a particular topic or set of topics.

Evaluator 116 determines a value or relevance of each summary 110(1)-110($x$) and each meta-summary 114(1)-114($z$) for the selected task. In one example, the selected task may include one or a combination of the following:

(1) text classification;
(2) education;
(3) training;
(4) document classification;
(5) data mining;
(6) metadata tagging;
(7) keyword identification;
(8) Re-structuring of the text;
(9) text chunking/segmentation;
(10) topic identification;
(11) author identification; or
(12) jargon identification.

In other examples, the selected task may include another suitable application, Each summary and meta-summary is evaluated for its relative value in the selected task. The relative value in the selected task, (i.e., the relevance or utility for the selected task), is evaluated based on a ground truth set, feedback received from users, or other suitable criteria applicable to the selected task. Each task is described in more detail below.

Selector 118 selects the summary or meta-summary based on the assessed value, (or utility or relevance), to the selected task to provide recommended deployment settings. In one example, selector 118 selects the summary or meta-summary having the highest assessed value to the selected task to provide recommended deployment settings. In other examples, selector 118 selects the summary or meta-summary having an assessed value over a predefined threshold for the selected task to provide recommended deployment settings. The recommended deployments settings include the summarization engines and/or meta-algorithmic patterns that provide the optimum summarization architecture for the selected task. The optimum summarization architecture can be integrated into a system real-time. The system can be re-configured per preference, schedule, need, or upon the completion of a significant amount of new instances of the tasks.

(1) Text classification is assigning text chunks, which range from phrases, clauses, and paragraphs to documents or sets of documents, to specific classes of interest to the user population. Text classification is related to (4) document classification described below except that text classification has different boundaries for the text segmentation. For a text classification task, the summaries and meta-summaries are evaluated to determine the summarization architecture that provides the text classification that significantly matches the training (i.e., the ground truth) set. Generally, the larger the training set and the larger the number of summarization engines available, the better the final system performance. System performance is optimized, however, when the training set is much larger than the number of summarization engines. The summarization architecture is then selected and recommended for deployment.

(2) Education is learning tied to proof of understanding. Educational materials are delivered to users followed by scoring the proficiency of the users (e.g., by using tests, quizzes, or other means of assessing material familiarity/confluence). For the education task, the summaries and meta-summaries are evaluated to determine the summarization architecture that provides the educational materials that result in the highest absolute and/or relative scores. The summarization architecture is then selected and recommended for deployment.

(3) Training is learning tied to proof of ability. Training materials are delivered to users followed by scoring of the capability of the users (e.g., by the ability to perform a task). For the training task, the summaries and meta-summaries are evaluated to determine the summarization architecture that provides the training materials that result in the highest absolute and/or relative scores. The summarization architecture is then selected and recommended for deployment.

(4) Document classification is the assignment of documents to different (i.e., separate) classes that optimize the similarity within classes while ensuring distinction between classes. Summaries provide one means to classify documents since they provide a distilled set of text that can be used for indexing and searching, For the document classification task, the summaries and meta-summaries are evaluated to determine the summarization architecture that provides the document classification that significantly matches the training (i.e., ground truth) set, The summarization architecture is then selected and recommended for deployment.

(5) Data mining is the discovery of patterns in large data sets. Summarization engines can be combined to provide a consensus for the data extracted. On the inclusive side, data mining can provide an exhaustive description of the text information. On the exclusive side, data mining can provide the gist of the document content or the content that distinguishes the document from other documents. For the data mining task, the summaries and meta-summaries are evaluated to determine the summarization architecture that provides the data mining results that provide a significant recovery of tagged content (e.g., ground truth to-be-mined data). The summarization architecture is then selected and recommended for deployment.

(6) Metadata tagging is related to (5) data mining, in that the output of the summarizers are used to tag documents. For the metadata tagging task, the summaries and meta-summaries are evaluated to determine the summarization architecture that provides the metadata tags (e.g., indices, descriptors, semantic tags) that provide a significant match to the ground truth set. The summarization architecture is then selected and recommended for deployment (7) Keyword identification is related to (4) document classification. In Keyword identification, the keywords of a text element are used to tag a document for classification. Keyword identification, unlike (10) topic identification described below, can be unsupervised, in which case the keywords are not known a priori. For the keyword identification task, the summaries and meta summaries are evaluated to determine the summarization architecture that provides the highest accuracy keyword definition (e.g., for text classification or search accuracy). The summarization architecture is then selected and recommended for deployment.

(8) Re-structuring of the text is for the preparation for column-based or other structured data analytics When text is prepared for data mining, different summaries may provide better output for meaningful analytics than the original text. Different summarization engines may ignore different "non-payload" text, such as HTML tags and meta-data, so that the summaries correspond better with the actual payload, or content, of the text. For the re-structuring of text task, the summaries and meta-summaries are evaluated to determine the summarization architecture that provides a re-structuring of the text such that the analytics significantly match the raw text for a known, ground truth set The summarization architecture is then selected and recommended for deployment.

(9) Text chunking/segmentation is a method of summarizing or presenting text that splits concepts into small pieces of information to make reading and understanding more efficacious. Chunking includes bulleted lists, short subheadings, condensed sentences with one or two ideas per sentence, condensed paragraphs, scan-friendly text (e.g., with key words and concepts italicized or boldfaced), and graphics designed to guide the eyes to key sections, For the text chunking/segmentation task, the summaries and meta summaries are evaluated to determine the summarization architecture that results in better understanding (e.g., see (2) education and (3) training tasks discussed above) or results in better matching to an expert-provided chunking/segmentation (e.g., a blurb). The summarization architecture is then selected and recommended for deployment.

(10) Topic identification is related to (4) document classification. The topic identification is a means of filing or otherwise assigning a text element to a class. Identification of the topic or topics, unlike (7) keyword identification, is generally associated with selecting from a list or taxonomy. For the topic identification task, the summaries and meta-summaries are evaluated to determine the summarization architecture that provides the highest accuracy association of text elements with a list, dictionary, or taxonomy. The summarization architecture is then selected and recommended for deployment.

(11) Author identification is using author word usage, key phrases, and word patterns to identify the author's identity. Different approaches include determination of the author s native language from the types of text errors that exist in the document, determination of style (e.g., stylometry) using machine learning and rules such as "rare pairs", and other summarizer outputs. The summarization engines used for author identification are often quite different from those used for the other tasks described herein, since the sentences, phrases, etc, which identify an author do not necessarily "stand out" from a general corpus. Therefore, in one example, summarization engines intentionally configured to perform differently from their default settings may be used for author identification. For the author identification task, the summaries and meta-summaries are evaluated to determine the summarization architecture that works better to identify authors of known (e.g., ground truth) documents. The summarization architecture is then selected and recommended for deployment.

(12) Jargon identification is identifying irregular word usage that is consistent with jargon. Irregular word usage consistent with jargon can be the output of specific summarizers. Alternatively, jargon can often be identified by the difference in the output of separate summarizer. Jargon can also be associated with differences in part of speech assignment. The terms for which participation in summarizers is entropic, for example, may be jargon. For the jargon identification task, the summaries and meta-summaries are evaluated to determine the summarization architecture that significantly identifies known jargon. This means that sentences and phrases containing a disproportionate amount of jargon are preferable. Summarization engines sensitive to part of speech usage of words and their deviation from expected part of speech usage, therefore, may be of optimal value for jargon identification. The summarization architecture is then selected and recommended for deployment.

Figure 2:
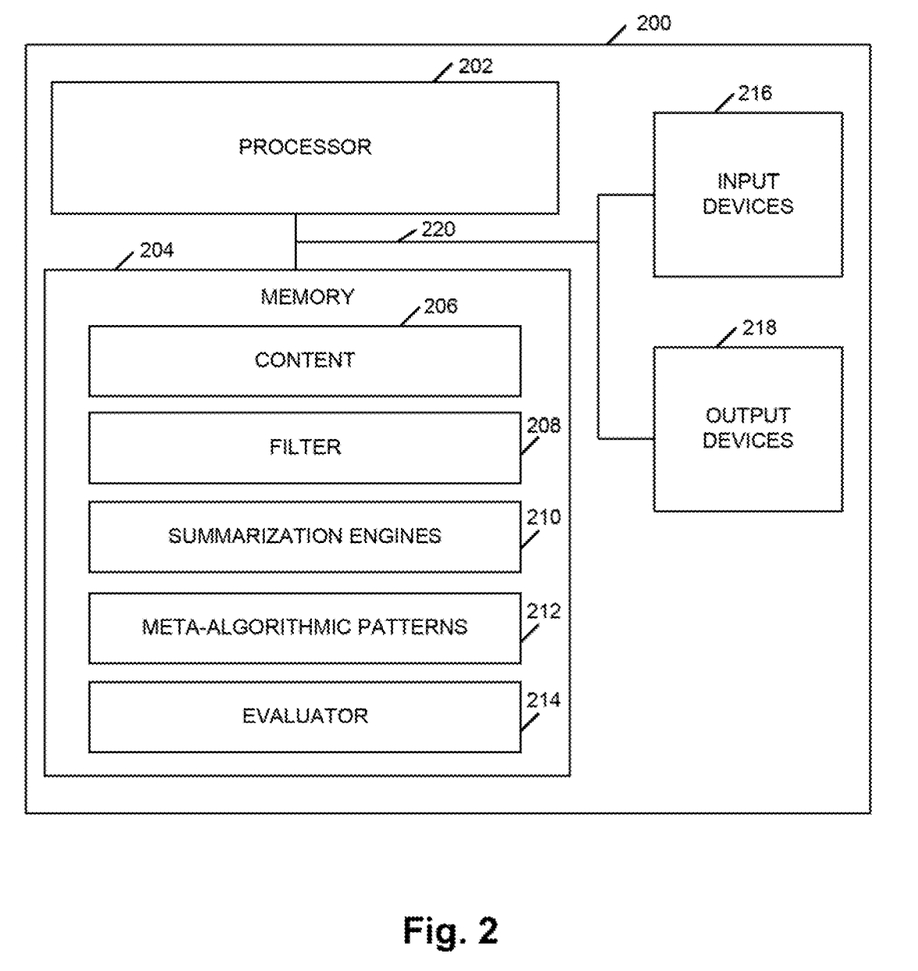
FIG. 2 s a block diagram illustrating one example of a processing system for implementing the system for determining an optimized summarizer architecture for a selected task.

FIG. 2 is a block diagram illustrating one example of a processing system 200 for implementing system 100 for determining an optimized summarizer architecture for a selected task. Processing system 200 includes a processor 202, a memory 204, input devices 216, and output devices 218. Processor 202, memory 204, input devices 216, and output devices 218 are communicatively coupled to each other through communication link 220 (e.g., a bus).

Processor 202 includes a Central Processing Unit (CPU) or another suitable processor. In one example, memory 204 stores machine readable instructions executed by processor 202 for operating processing system 200. Memory 204 includes any suitable combination of volatile and/or non-volatile memory, such as combinations of Random Access Memory (RAM), Read-Only Memory (ROM), flash memory, and/or other suitable memory.

Memory 204 stores content 206 for processing by processing system 200. Memory 204 also stores instructions to be executed by processor 202 including instructions for a filter 208, summarization engines 210, meta-algorithmic patterns 212, and an evaluator 214. In one example, filter 208, summarization engines 210, meta-algorithmic patterns 212, and evaluator 214 include filter 104, summarization engines 108, meta-algorithmic patterns 112(1)-112($v$), and evaluator 116, respectively, as previously described and illustrated with reference to FIG. 1.

Processor 202 executes instructions of filter 208 to filter content 206 to provide filtered content. Processor 202 executes instructions of summarization engines 210 to summarize the filtered content to provide summaries. Processor 202 executes instructions of meta-algorithmic patterns 212 to summarize the summaries to provide meta-summaries. Processor 202 executes instructions of evaluator 214 to evaluate the summaries and meta-summaries to determine the optimum summarization architecture for a selected task. The optimum summarization architecture for the selected task is then recommended for deployment by processing system 200.

Input devices 216 include a keyboard, mouse, data ports, and/or other suitable devices for inputting information into processing system 200. In one example, input devices 216 are used to input feedback from users for evaluating the summaries and meta-summaries for a selected task, such as for education or training. Output devices 218 include a monitor, speakers, data ports, and/or other suitable devices for outputting information from processing system 200, in one example, output devices 218 are used to output summaries and meta-summaries to users and to recommend the optimum summarization architecture for a select task.

Figure 3:
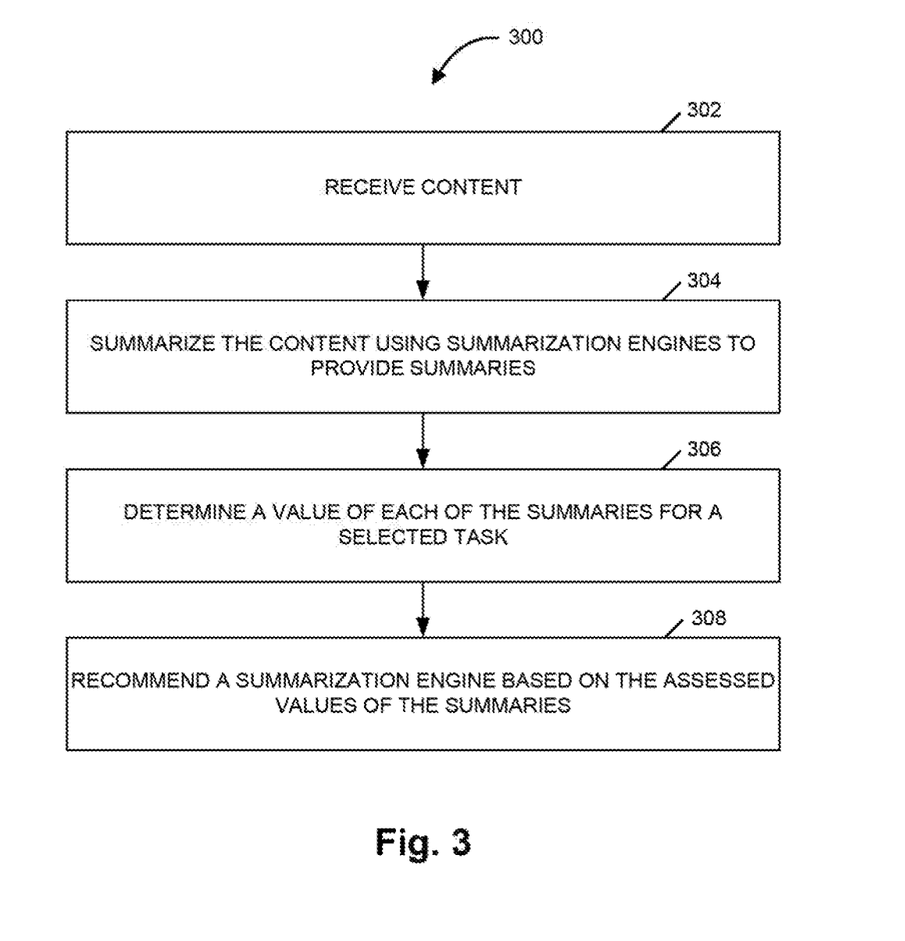
FIG. 3 is a flow diagram illustrating one example of a method for determining an optimized summarizer architecture for a selected task.

FIG. 3 is a flow diagram illustrating one example of a method 300 for determining a summarizer architecture optimized for a selected task. At 302, content to be processed is received. At 304, the content is summarized using summarization engines to provide summaries. At 306, a value of each of the summaries for a selected task is determined. At 308, a summarization engine is recommended based on the assessed values of the summaries.

Figure 4:
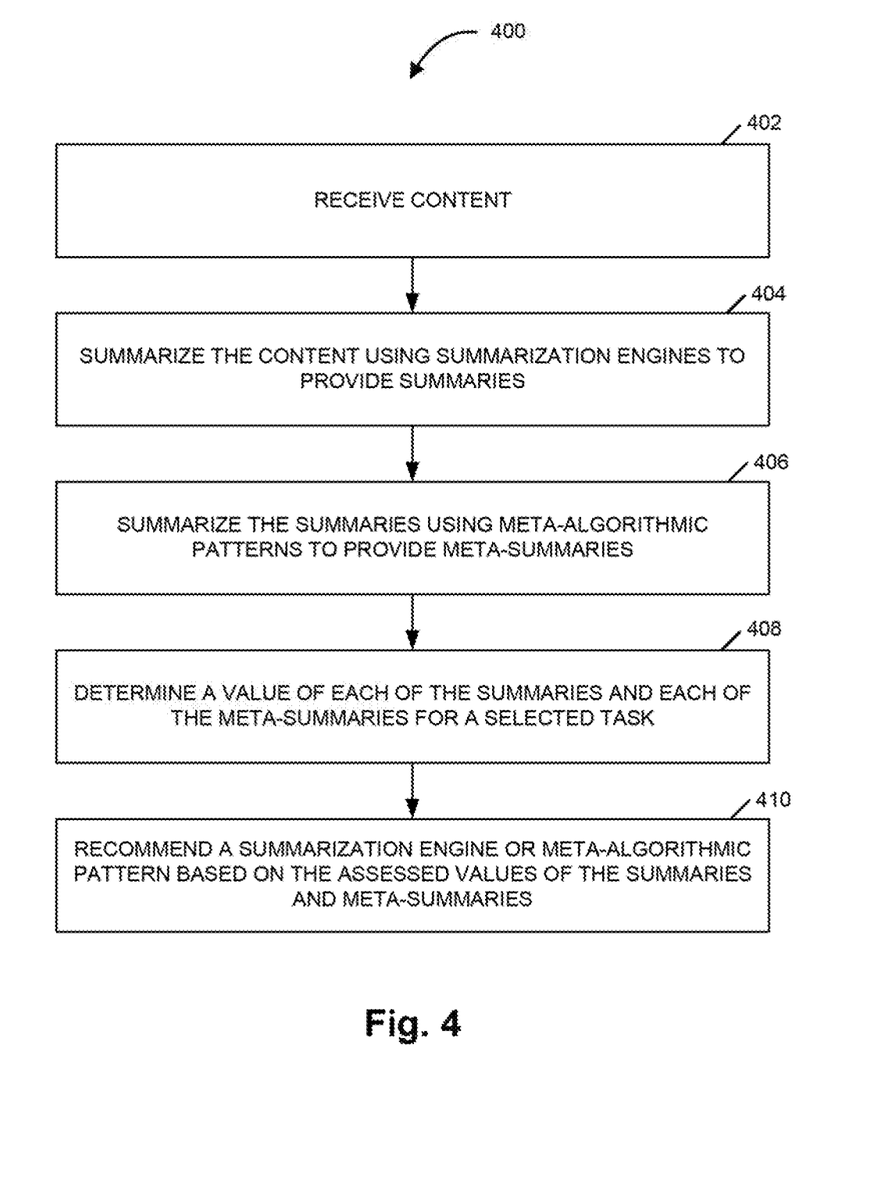
FIG. 4 is a flow diagram illustrating another example of a method for determining an optimized summarizer architecture for a selected task.

FIG. 4 is a flow diagram illustrating another example of a method 400 for determining an optimized summarizer architecture for a selected task. At 402, content to be processed is received. At 404, the content is summarized using summarization engines to provide summaries. At 406, the summaries are summarized using meta-algorithmic patterns to provide meta-summaries. At 408, a value of each of the summaries and each of the meta-summaries for a selected task is determined. At 410, a summarization engine or meta-algorithmic pattern is recommended based on the assessed values of the summaries and meta-summaries.

Examples of the disclosure provide a generalized system for using multiple summaries and meta-algorithmics to optimize a text-related intelligence generating or machine intelligence system. The generalized system provides a pattern-based, automatable approach to summarization that can learn and improve over time, and is not fixed on a single technology or machine learning approach in this way, the content used to represent a larger body of text, suitable to a wide range of applications, can be optimized.

Although specific examples have been illustrated and described herein, a variety of alternate and/or equivalent implementations may be substituted for the specific examples shown arid described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
 a processing system including a processor and a memory communicatively coupled to the processor;
 a plurality of summarization engines, each summarization engine to receive content to provide a summary of the content via the processing system;
 an evaluator to determine a value of each summary for a task via the processing system;
 a selector to select, via the processing system, a summarization engine for the task from the plurality of summarization engines based on the assessed value of each summary; and
 a plurality of meta-algorithmic patterns, each meta-algorithmic pattern to be applied to at least two summaries to provide a meta-summary using the at least two summaries via the processing system,
 wherein the evaluator determines a value of each meta-summary for the task, and
 wherein the selector selects a meta-algorithmic pattern for the task from the plurality of meta-algorithmic patterns based on the assessed value of each meta-summary.

2. The system of claim 1, wherein the task comprises text classification, education, training, document classification, data mining, metadata tagging, keyword identification, re-structuring of text, text chunking/segmentation, topic identification, author identification, or jargon identification.

3. The system of claim 1, further comprising:
 a filter to filter, via the processing system, the received content to provide filtered content,
 wherein each of the plurality of summarization engines is to receive the filtered content to provide a summary of the filtered content via the processing system.

4. The system of claim 1, wherein each of the plurality of summarization engines is to output a set of key words; a set of key phrases; an extractive set of clauses; an extractive set of sentences; an extractive set of clustered sentences, paragraphs, and text chunks; or an abstractive summarization.

5. The system of claim 1, wherein each of the plurality of meta-algorithmic patterns is based on a weighted voting approach, expert feedback, generalized hybridization, constrained substitute, or predictive selection.

6. The system of claim 1, wherein the evaluator is to determine the value of each summary by comparing each summary to a ground truth set.

7. A system comprising:
 a processing system including a processor and a memory communicatively coupled to the processor;
 a plurality of summarization engines, each summarization engine to receive content to provide a summary of the content via the processing system;
 an evaluator to determine a value of each summary for a task via the processing system;
 a selector to select, via the processing system, a summarization engine for the task from the plurality of summarization engines based on the assessed value of each summary; and
 a plurality of meta-algorithmic patterns, each meta-algorithmic pattern to be applied to at least two summaries to provide a meta-summary using the at least two summaries via the processing system,
 wherein the evaluator determines a value of each meta-summary for the task, and
 wherein the selector selects for deployment the meta-algorithmic pattern or the summarization engine that provides the meta-summary or summary, respectively, having the highest assessed value for the task.

8. The system of claim 7, wherein the selector selects for deployment the meta-algorithmic patterns and/or the summarization engines which provide the meta-summaries and/or summaries, respectively, having the highest assessed values for the task.

9. The system of claim 7, wherein the task comprises text classification, education, training, document classification, data mining, metadata tagging, keyword identification, re-structuring of text, text chunking/segmentation, topic identification, author identification, or jargon identification.

10. The system of claim 7, further comprising:
 a filter to filter, via the processing system, the received content to provide filtered content,
 wherein each of the plurality of summarization engines is to receive the filtered content to provide a summary of the filtered content via the processing system.

11. The system of claim 7, wherein each of the plurality of summarization engines is to output a set of key words; a set of key phrases; an extractive set of clauses; an extractive set of sentences; an extractive set of clustered sentences, paragraphs, and text chunks; or an abstractive summarization.

12. The system of claim 7, wherein each of the plurality of meta-algorithmic patterns is based on a weighted voting approach, expert feedback, generalized hybridization, constrained substitute, or predictive selection.

13. The system of claim 7, wherein the evaluator is to determine the value of each summary by comparing each summary to a ground truth set.

14. A method for determining a summarizer architecture optimized for a task, the method comprising:
 receiving content via a processing system;
 summarizing the content using a plurality of summarization engines to provide a plurality of summaries via the processing system;
 determining a value of each of the plurality of summaries for the task via the processing system;
 recommending for deployment, via the processing system, a summarization engine based on the assessed values of the plurality of summaries;
 summarizing the plurality of summaries using a plurality of meta-algorithmic patterns to provide a plurality of meta-summaries via the processing system;
 determining a value of each of the plurality of meta-summaries for the task via the processing system; and recommending for deployment, via the processing system, a meta-algorithmic pattern based on the assessed values of the meta-summaries.

15. The method of claim 14, further comprising:
filtering the content prior to summarizing the content.

16. The method of claim 14, wherein determining the value of each of the plurality of summaries comprises determining the relative value of each of the plurality of summaries based on feedback received from users of each of the plurality of summaries for the task.

17. The method of claim 14, wherein determining the value of each of the plurality of summaries comprises comparing each of the plurality of summaries to a known data set for the task.

18. The method of claim 14, wherein the task comprises text classification, education, training, document classification, data mining, metadata tagging, keyword identification, re-structuring of text, text chunking/segmentation, topic identification, author identification, or jargon identification.

19. The method of claim 14, wherein summarizing the content comprises outputting a set of key words; a set of key phrases; an extractive set of clauses; an extractive set of sentences;
an extractive set of clustered sentences, paragraphs, and text chunks; or an abstractive summarization.

20. The method of claim 14, wherein each of the plurality of meta-algorithmic patterns is based on a weighted voting approach, expert feedback, generalized hybridization, constrained substitute, or predictive selection.

\* \* \* \* \*